(12) United States Patent
Chen et al.

(10) Patent No.: US 8,917,577 B2
(45) Date of Patent: Dec. 23, 2014

(54) MICROPHONE PROXIMITY DETECTION

(71) Applicant: Apple Inc., Cupertino, CA (US)

(72) Inventors: Shaohai Chen, Cupertino, CA (US);
Richard Hung Minh Dinh, San Jose, CA (US); Jae Lee, San Jose, CA (US); Chad G. Seguin, Morgan Hill, CA (US); Benjamin J. Pope, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/936,599

(22) Filed: Jul. 8, 2013

(65) Prior Publication Data

US 2013/0295906 A1 Nov. 7, 2013

Related U.S. Application Data

(62) Division of application No. 13/478,545, filed on May 23, 2012, now Pat. No. 8,488,411, which is a division of application No. 12/242,608, filed on Sep. 30, 2008, now Pat. No. 8,189,429.

(51) Int. Cl.
*H04M 1/00* (2006.01)
*H04W 8/22* (2009.01)
*H04M 1/60* (2006.01)
*G01S 11/14* (2006.01)
*H04M 1/03* (2006.01)

(52) U.S. Cl.
CPC ............... *H04W 8/22* (2013.01); *H04M 1/605* (2013.01); *H04M 1/03* (2013.01); *G01S 11/14* (2013.01); *H04M 1/6008* (2013.01); *H04M 2250/22* (2013.01)
USPC ........................................ 367/118; 455/569.1

(58) Field of Classification Search
USPC ................... 367/95, 118; 455/569.1
See application file for complete search history.

(56) References Cited

U.S. PATENT DOCUMENTS

| | | | | |
|---|---|---|---|---|
| 5,224,151 A | * | 6/1993 | Bowen et al. | 455/569.1 |
| 5,448,620 A | * | 9/1995 | Gershkovich et al. | 455/567 |
| 5,712,911 A | | 1/1998 | Her | |
| 5,729,604 A | | 3/1998 | Van Schyndel | |
| 6,104,808 A | | 8/2000 | Alameh | |
| 6,349,225 B1 | * | 2/2002 | Lands et al. | 455/575.3 |
| 6,542,436 B1 | | 4/2003 | Myllyla | |

(Continued)

OTHER PUBLICATIONS

Non-Final Office Action (dated Sep. 24, 2010), U.S. Appl. No. 12/242,608, filed Sep. 30, 2008, First Named Inventor: Shaohai Chen, 6 pages.

(Continued)

*Primary Examiner* — Ian J Lobo
(74) *Attorney, Agent, or Firm* — Blakely, Sokoloff, Taylor & Zafman LLP

(57) ABSTRACT

A mobile communications device contains at least two microphones. One microphone is located away from the handset receiver and serves to pick up voice of a near end user of the device for transmission to the other party during a call. Another microphone is located near the handset receiver and serves to pick up acoustic output of the handset receiver (a far end signal). A signal processor measures the frequency response of the receiver. The signal processor performs spectral analysis of the receiver frequency response to determine whether or not the device is being held at the ear of the user. On that basis, the device automatically changes its operating mode, e.g., turns on or off a touch sensitive display screen during the call. Other embodiments are also described.

14 Claims, 7 Drawing Sheets

(56) References Cited

U.S. PATENT DOCUMENTS

| | | |
|---|---|---|
| 6,639,987 B2 | 10/2003 | McIntosh |
| 6,925,296 B2 | 8/2005 | Mattisson |
| 7,054,450 B2 | 5/2006 | McIntosh et al. |
| 7,106,865 B2 | 9/2006 | Pavlov |
| 7,280,958 B2 | 10/2007 | Pavlov et al. |
| 7,701,567 B2 * | 4/2010 | Chow .......................... 356/218 |
| 8,189,429 B2 | 5/2012 | Chen et al. |
| 8,290,543 B2 * | 10/2012 | Emery et al. ............... 455/569.1 |
| 2005/0221791 A1 * | 10/2005 | Angelhag .................. 455/343.5 |
| 2006/0060762 A1 | 3/2006 | Chan |
| 2008/0167834 A1 | 7/2008 | Herz et al. |
| 2008/0274395 A1 | 11/2008 | Shuster |
| 2009/0055854 A1 | 2/2009 | Wright |
| 2009/0088204 A1 | 4/2009 | Culbert |
| 2009/0254339 A1 | 10/2009 | Seguin |

OTHER PUBLICATIONS

Non-Final Office Action (dated Apr. 28, 2011), U.S. Appl. No. 12/242,608, filed Sep. 30, 2008, First Named Inventor: Shaohai Chen, 6 pages.

Final Office Action (dated Oct. 27, 2011), U.S. Appl. No. 12/242,608, filed Sep. 30, 2008, First Named Inventor: Shaohai Chen, 6 pages.

Non-Final Office Action (dated Aug. 14, 2012), U.S. Appl. No. 13/478,545, filed May 23, 2012, First Named Inventor: Shaohai Chen, 8 pages.

Final Office Action (dated Jan. 11, 2013), U.S. Appl. No. 13/478,545, filed May 23, 2012, First Named Inventor: Shaohai Chen, 11 pages.

* cited by examiner

MICROPHONE PROXIMITY DETECTION

RELATED MATTERS

This application is a divisional of co-pending application Ser. No. 13/478,545 filed on May 23, 2012, which is a divisional application of U.S. patent application Ser. No. 12/242,608, Filed Sep. 30, 2008, entitled "Microphone Proximity Detection", now issued as U.S. Pat. No. 8,189,479.

FIELD

An embodiment of the invention is generally related to mobile devices that have a microphone located near a handset receiver and that can detect proximity of the device to an object using a frequency response measurement enabled by the microphone.

BACKGROUND

Portable handheld electronic devices, such as the iPhone™ multifunction device by Apple Inc., have two general cellular telephony modes: speakerphone (or simply, speaker) mode and handset (or receiver) mode. A user generally operates the device in handset mode when he is holding the device near or against his ear, so that an audio signal from the other party of the call emits from the receiver (or earpiece speaker) of the device. A user generally operates the device in speaker mode when the device is situated away from his ear, so that an audio signal from the other party of the call emits from the speakerphone speaker (or loudspeaker) of the device (allowing the user to hear the other party without placing the device near his ear). When the device is being held against the user's ear during a phone call, a proximity detector automatically senses this condition, using an infrared sensor that is built into the device, and on that basis turns off the touch sensitive display screen of the device. The proximity detector can also automatically sense when the device is then moved away from the user's ear. When that happens, the device displays a set of virtual buttons on its touch screen which present various call handling functions such as end call, mute, keypad, and contacts list.

SUMMARY

In one embodiment of the invention, a mobile device may be operating in handset mode during a call when it automatically detects that its user (near end user) has moved the device away from his ear, during the call, to an "open" position. The detection is based on a signal picked up by a microphone located near the handset receiver, separate from the microphone that is used to pick up the near end user's voice. The signal represents a far end audio signal (from a far end user), that is being converted by the handset receiver into sound. The detection may perform a frequency response analysis on the microphone's output signal. Upon such detection, the device may automatically perform any one of various device features, such as turning on a display screen to show virtual buttons for handling the ongoing call, and perhaps switching the device from handset mode to speaker mode. A similar technique may be used to automatically detect that the user has moved the device back from the open position to the at-the-ear position.

In another embodiment, the device may be operating in speaker mode when it detects that the near end user of the device has moved the device to his ear during a call. This detection may also be based on a signal received by the microphone located near the handset receiver. In this case, a time domain (power or amplitude) measurement of the microphone's output signal may be appropriate, to determine the proximity of the device to the user's ear. As the device nears the user's ear, the detection methodology determines whether the device is in an at-ear position or open position and may further use this information to, for example, turn on or off a display screen or automatically switch from speaker mode to handset mode, thus also eliminating the need for the user to manually select a button to set the device from speaker mode to handset mode.

As described above, the analysis performed on the output signal of the microphone (which is located near the handset receiver of the device) may be different, depending on the current operating mode of the device. If the device is in handset mode, i.e., its functions are aimed at the situation where the near end user is holding the device at her ear, proximity detection may be based on a frequency response measurement of the receiver. If the device is in speaker mode, i.e., its functions are aimed at the situation where the near end user is holding the device in the open or away from her ear, the proximity detection may be based on a time domain measurement of the loudspeaker (speakerphone speaker).

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

In this section, several preferred embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
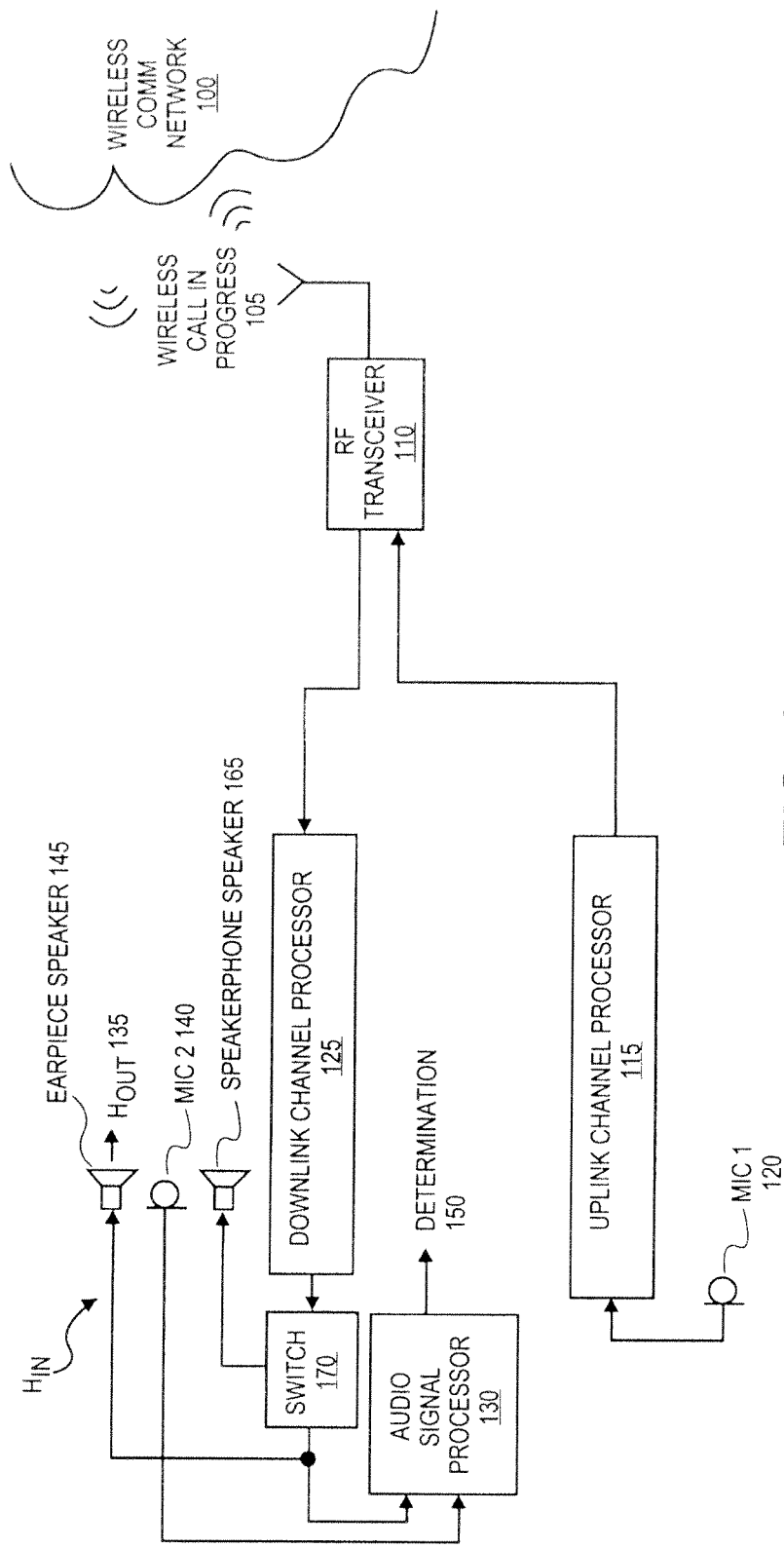
FIG. 1 is a block diagram of a portable handheld device with enhanced proximity detection capabilities.

FIG. 1 is a block diagram of a portable handheld device with enhanced proximity detection capabilities operating in a wireless communications network 100. The device may be an iPhone™ device by Apple Inc. of Cupertino, Calif., which is similar in many aspects to the device 200 depicted in FIG. 2A. Alternatively, it could be any other portable handheld multi-function electronic device or smart phone that has the handset mode and speaker mode options for calling. The device may have a fixed, single piece housing like the iPhone™ device (or the device 200 depicted in FIG. 2A), or it may have a movable, multi-piece housing such as a clamshell design or sliding keypad. The device may also have a display screen which can be used to display typical smartphone features such as visual voicemail, web browsing, email, digital camera photos, and others.

The device includes an antenna 105 that receives and transmits signals in conjunction with a radio frequency transceiver 110 for a wireless call between a near end user of the device and another party, the far end user. Two main channels may be implemented for the device: an uplink channel processor 115 and a downlink channel processor 125. The uplink channel processor 115 supports the transmission of audio signals originating from the near end user of the device acquired by a first microphone 120 and sent to the far end user over the wireless communications network 100. In other words, when the near end user speaks, his voice signal is transmitted by the uplink channel processor 115 to the other party.

The downlink channel processor 125 supports the transmission of audio signals received from the far end user over the wireless communications network 100. For example, when the far end user speaks, his voice signal is received and transmitted by the downlink channel processor 125 for listening by the near end user of the device. During a call, the device may operate in one of two modes: handset mode or speaker mode. The initial mode setting for a call may be set by default. For example, the device may be configured to initialize all calls in handset mode. In another example, the device may be configured to initialize all calls in the mode of the immediately preceding call. Furthermore, the near end user of the device may set the mode before or during a call by manually making the selection, e.g., by pressing a button. Each of these factors commands the switch 170 to provide the audio signal of the far end user to either a speaker mode route or a handset route. Telephone communications in speaker mode utilize the speakerphone speaker 165 while telephone communications in handset mode utilize the earpiece receiver speaker 145. The speakerphone speaker 165 may project audio signals more loudly than the earpiece speaker 145 since the earpiece speaker may be situated in close proximity to a person's ear while in use.

In the case of handset mode, the switch 170 routes the downlink signal to the earpiece speaker 145 and the audio signal processor 130. The earpiece speaker 145 emits audio or sound of the far end user, for the near end user to hear (receiver acoustic signal). A spectral analysis of frequency response $H_{out}/H_{in}$ as directed to the earpiece speaker 145 may be evaluated. $H_{in}$ corresponds to the input of the earpiece speaker 145 and $H_{out}$ corresponds to its output. The audio signal processor 130 may acquire the $H_{in}$ reading directly from the downlink channel processor 125. A second microphone 140 located near the earpiece speaker 145 picks up the acoustic signal emitted from the earpiece speaker 145 and feeds it to the audio signal processor 130 for the $H_{out}$ reading.

The acoustic load on the earpiece speaker 145 (and corresponding measured frequency response $H_{out}/H_{in}$) is influenced by two main factors: the characteristics of the earpiece receiver speaker 145 and the acoustic environment surrounding it. The frequency range of the earpiece receiver speaker 145 influences the signal from input to output. Since the speaker remains the same once it is installed, this factor does not change as one uses the device. However, the environment surrounding the receiver speaker 145 changes when the user repositions the device close to or away from an object, such as the user's ear. In particular, a changing acoustic environment alters the $H_{out}$ reading in the manner that will be discussed next. This alteration of $H_{out}$ is then used to derive proximity information for the device.

Figure 2A:
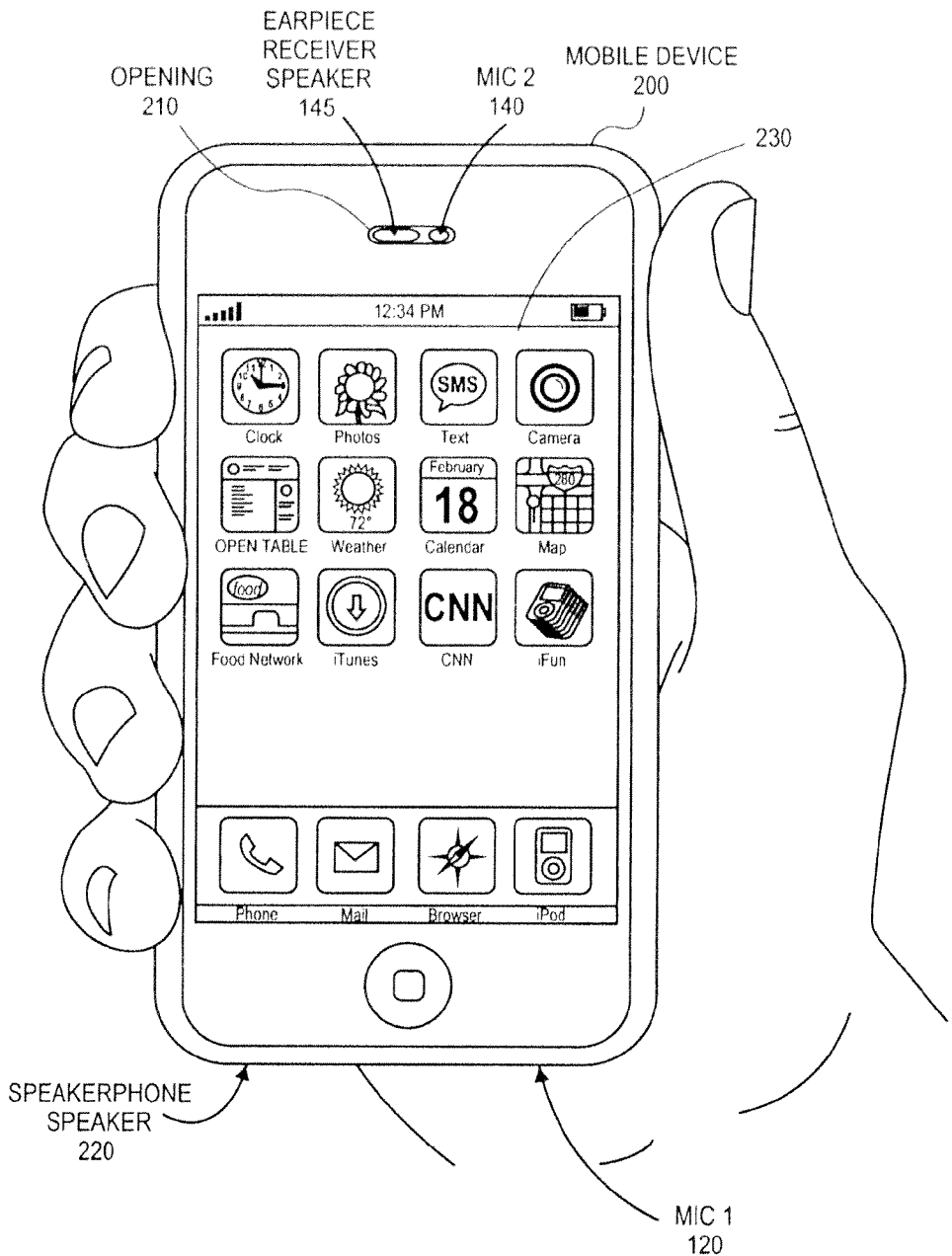
FIG. 2A shows a portable handheld device having an additional microphone located near the receiver speaker for enhanced proximity detection.

Turning now to FIG. 2A, this figure depicts an example embodiment of a portable handheld device 200 having an additional microphone 140 located near the receiver speaker 145 for enhanced proximity detection. In this illustration, a near end user is holding the device 200 in her hand. The microphone 140 is in addition to another microphone 120 that is located far from the earpiece speaker 140 and that acquires the sound of a near end user's voice to be transmitted to the other party (or parties) of a call.

The device 200 includes various capabilities to enable the user to access features involving, for example, calls, text messages, voicemail, e-mail, the Internet, scheduling, photos, and music as shown on the display screen 230. With respect to calling in both handset mode and speaker mode, the first microphone 120 picks up a near end audio signal for transmission to the other party of the call. This microphone 120 may be positioned away from the earpiece receiver speaker 145 so that the voice signal of the near end user may be more easily received, e.g. at the bottom end portion of the device 200.

When the user holds the device 200 to his head during a call in device handset mode, the earpiece receiver speaker 145 (which may be located at a top end portion of the device 200) may be positioned against the user's ear. In that case, the first microphone 120 is situated in the general direction of the user's mouth to receive the voice signal emitted from the mouth. During this handset call, the receiver speaker 145 emits the audio signal originating from the far end user (the other party to the call) directly into the near end user's ear. An opening 210 may be defined for both the earpiece receiver speaker 145 and the second microphone 140. The second microphone 140 receives the signal emitted from the earpiece receiver speaker 145 (a receiver acoustic signal). This signal provides the $H_{out}$ variable described above. Since $H_{out}$ differs when the opening area 210 (including the receiver speaker 145 and the second microphone 140) is "sealed" by the user's ear, in contrast to when exposed to open air, such information may be used in a frequency response analysis to determine whether the device is in an at-ear position or an open position, as explained with respect to FIG. 1.

Returning to FIG. 1, the audio signal processor 130 measures the frequency response as it is changed by the changing acoustic environment. A communications device may have two main in-use positions: an at-ear position and an open position. The at-ear position is one in which the device is being held to the user's ear and the earpiece speaker 145 is "sealed" by the contact of the ear to the device housing the region surrounding the earpiece speaker's opening. It should be noted that the closure of the ear around the housing opening (sound port) of the earpiece receiver speaker 145 is not perfectly "sealed," but such term is simply used to generally characterize the closed environment around the earpiece speaker 145 formed by the ear and the device. The open position refers to the device being held or placed "in the open," such as on a table or otherwise sufficiently away from a user's head and ear.

When the device is at the at-ear position, the frequency response magnitude at a frequency in a low frequency band is noticeably higher than when the device is at the open position. While the effect is similar in a high frequency band, the difference in frequency response is most noticeable in the low region, such as around 300 Hz. The low frequency band may be in the range of roughly less than 1000 Hz, where the full range for voice span is about 300 Hz to 3400 Hz. Thus, the analysis may be performed at a frequency of 300 Hz, for example. This large magnitude frequency response measurement at 300 Hz (for example) occurs because of the "sealed" environment surrounding the earpiece speaker 145 in the at-ear position, which causes $H_{out}$ (the output of the earpiece speaker 145 as read by the second microphone 140) to be high, in turn raising the ratio of $H_{out}/H_{in}$ as a function of frequency. Because $H_{in}$ is acquired by the audio signal processor 130 directly from the downlink channel processor 125, this value is not affected by the outside environment in relation to the device's position.

Figure 3A:
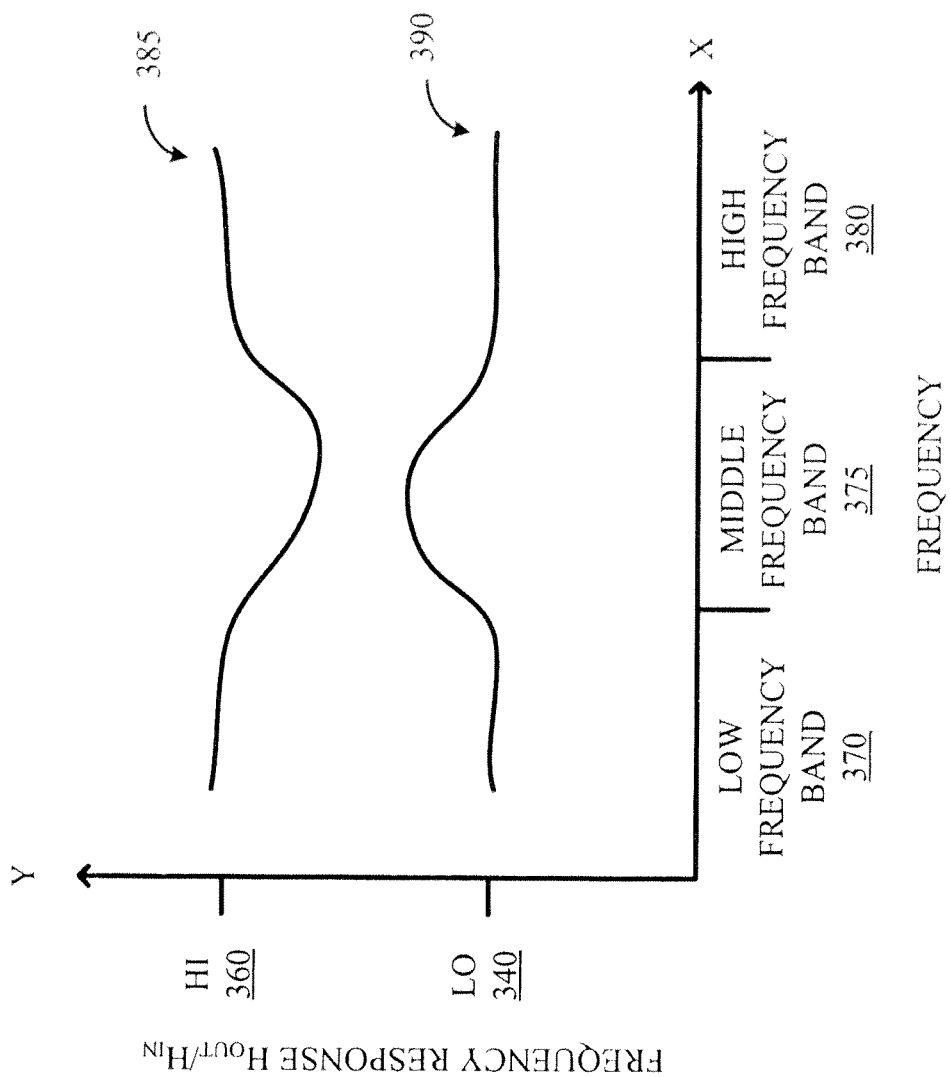
FIG. 3A illustrates a sample graph of frequency response measurements of a far end audio signal through a receiver at different device positions.
Figure 3B:
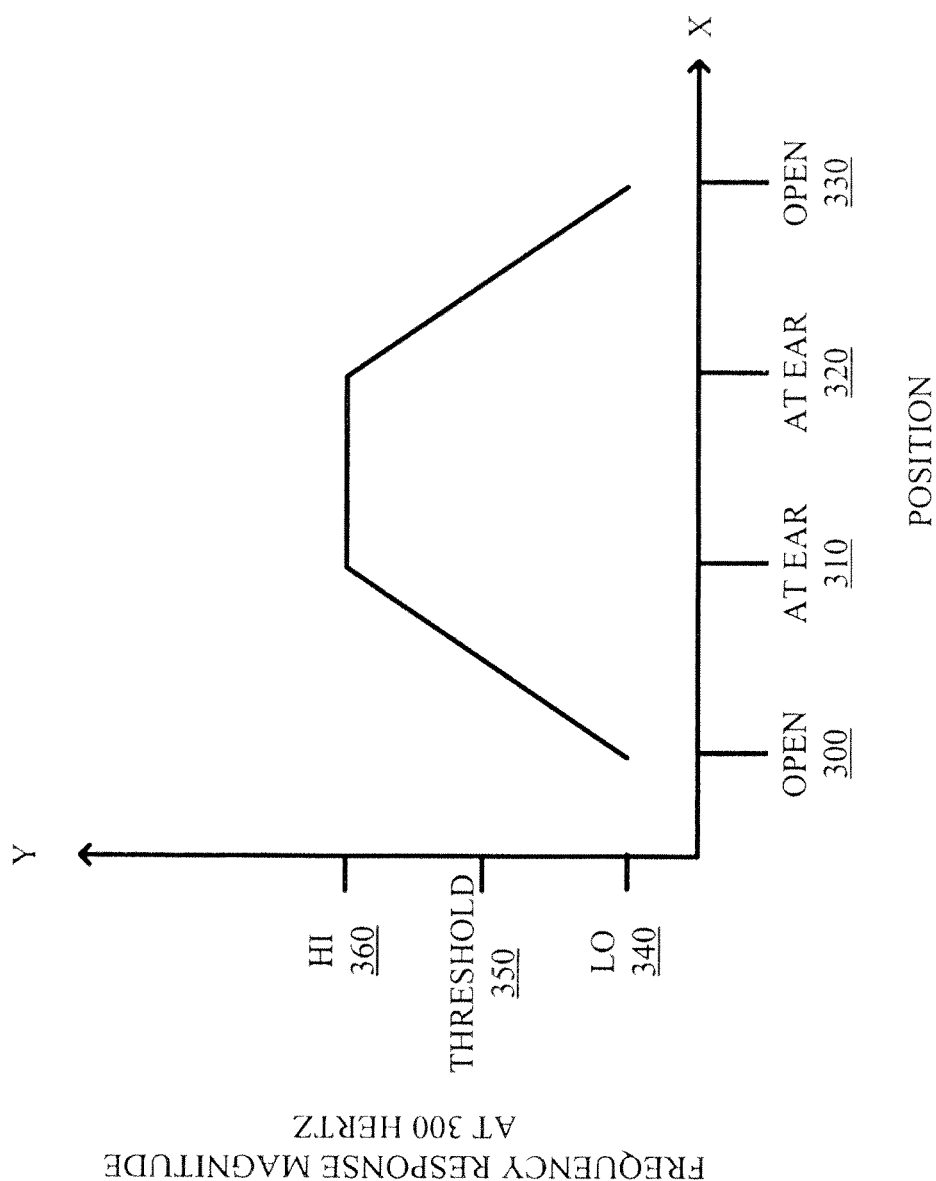
FIG. 3B is a sample graph of frequency response measurements (focused over a low frequency band) of a far end audio signal through a receiver at different device positions.

FIGS. 3A and 3B depict example frequency response measurements, $H_{out}/H_{in}$, of the receiver. Beginning with FIG. 3A, this graph presents an example of superimposed frequency response signals when the device is positioned in an at-ear position 385 and an open position 390. The x-axis represents the frequency range, approximately divided into a low frequency band 370, a middle frequency band 375, and a high frequency band 380. The y-axis represents the frequency response $H_{out}/H_{in}$, indicating a low value 340 and a high value 360. As this graph illustrates, the frequency response when the device is in an at-ear position 385 is noticeably higher than when the device is positioned in an open position 390. The frequency response analysis may be centered around a point in the low frequency band 370 since the measured difference is generally most prevalent in this range as compared to points in the middle frequency band 375 or high frequency band 380. However, it should be recognized that the frequency response analysis may also apply to any points in the frequency range of 3400 Hz, for instance.

FIG. 3B is a sample graph of frequency response measurements of a far end audio signal at different device positions. This graph indicates a range of frequency response magnitudes in a changing environment at a low level frequency, such as 300 Hertz. The specific positions of most concern that influence the environment are the at-ear position and the open position of the device.

The x-axis of this graph represents the position of the device. The positions are open 300, 330 and at-ear 310, 320, which respectively refer to a user holding the phone in an open environment or a "sealed" environment with the receiver speaker against his ear. The y-axis of the graph represents the frequency response magnitude at a low level frequency, such as 300 Hertz. This measurement represents the $H_{out}/H_{in}$ ratio and as explained above, the stated positions alter $H_{out}$, but not $H_{in}$. The y-axis markers indicated are points of low frequency response 340, threshold value frequency response 350, and high frequency response 360. It is noted that these values may differ based on the particular device or settings of the device and the illustration merely serves to present the values relative to each other.

During handset mode, the audio signal from a far end user transmits through the earpiece receiver speaker. When the device is in an open position, the frequency response measurement at 300 Hz is low 340. As the device is brought to the user's ear 310, the frequency response measurement at 300 Hz passes a threshold value 350 and becomes high 360. When the device is brought away from the user's ear 320 to an open position 330, the frequency response measurement at 300 Hz passes the threshold value 350 and becomes low 340. It is noted that the curve between the open positions 300, 330 and the at-ear positions 310, 320 are linearly drawn for simplicity, but in reality vary depending on the individual movement of the device. Because the frequency response ranges between low 340 and high 360 relative to position, one can discern whether the device is situated in an open position 300, 330 or an at-ear position 310, 320 based on the frequency response measurement. The threshold value 350 may be a variable set by the manufacturer or the user to indicate the cut off value for controlling device features such as switching from handset mode to speaker mode. There may also be another set frequency response threshold value (not shown) that controls a different feature, such as the powering on or off of the display screen.

Based on the measure of the frequency response magnitude at the low frequency, e.g., at 300 Hz, the audio signal processor 130 determines whether this measure corresponds to an at-ear position or an open position by comparing the frequency response value to a threshold value. The threshold value may be a midpoint value between the high and low values or it may be set at a point above or below the midpoint value. If the frequency response value remains above the threshold value, then the audio signal processor 130 reaches a determination 150 that the device is situated in the at-ear position (See FIG. 1). However, if the frequency response value drops below the threshold value, then the audio signal processor 130 reaches a determination 150 that the device has moved from the at-ear position to an open position. The audio signal processor 130 or other component may further use this information regarding position to command the switch 170 to maintain the handset mode or switch to a speaker mode as appropriate, eliminating the need for the user to manually actuate a button to change the device from handset mode to speaker mode.

In the case of speaker mode, the switch 170 routes the downlink signal to the speakerphone speaker 165. The speakerphone speaker 165 emits an audio sound from the far end user for the near end user to hear in a projecting manner such that the near end user need not position the device at his ear to hear the sound. When in speaker mode, the second microphone 140 picks up the speakerphone acoustic signal output by the speakerphone speaker 165 to determine a proximity of the device at the second microphone 140 to an object, such as the near end user's head. This proximity measurement may be based on a power/energy level or sound pressure level (time domain) rather than a frequency response measurement (frequency domain). As the near end user moves the device to his head, power level of the speakerphone acoustic signal picked up by the second microphone 140 decreases as the ear physically blocks the signal from being detected by the second microphone 140. The decreasing power level indicates a decreasing proximity of the device to the user's head. The signal processor 130 may be further configured to compare the proximity measurement to a threshold level to arrive at a determination 150 of whether the device is in an at-ear position or an open position. For example, the threshold level for speaker mode detection can be 6 inches. If the detected proximity remains above 6 inches, then the signal processor 130 determines that the device is in an open position. When the detected proximity falls below 6 inches, then the signal processor 130 determines that the device has switched from an open position to an at-ear position. It is noted that the threshold level may be adjusted to represent another value and may also be represented in other measurement terms, e.g., in metric terms. As similarly described above, the signal processor 130 or other component of the device may use the determination 150 to command the switch 170 to maintain speaker mode when the device is in an open position and to switch from speaker mode to handset mode when the device changes from an open position to an at-ear position.

When the user utilizes the device 200 in speaker mode during a call, the device 200 may be positioned on a table or otherwise held away from the user's head. The audio signal emitted from the speakerphone speaker 220 is typically louder than the audio signal emitted from the earpiece receiver speaker 145 because the device 200 is not in as close proximity to the user's ear. In speaker mode, the second microphone 140 may be used to inform about proximity, based on a power or sound pressure measurement in time domain, rather than a frequency response measurement in frequency domain. If the user brings the device towards his head during a speaker mode call, the device 200 may automatically switch from speaker mode to handset mode based on the determination that the position has changed from an open position to an at-ear position. The user thus does not need to manually select a button to switch the device from handset mode to speaker mode during the call.

Thus, to summarize one embodiment of the invention, proximity detection involving the second microphone 140 is analyzed differently for the device in handset mode and speaker mode, corresponding to a frequency response measurement and a time domain sound pressure level measurement, respectively. Furthermore, this proximity detection may operate in lieu of or in addition to a separate, infrared or other type of dedicated proximity sensor for the display screen. The proximity sensor for the display screen may control whether or not the display screen is powered on or off. For example, when the display screen is a touch screen, the screen turns off when the device is held to a user's ear so that contact by the user's face with the touch screen does not accidentally trigger a call handling function. The microphone-based proximity signal may be a secondary cue to enhance the overall accuracy of proximity detection. In the alternative, the proximity detection using the second microphone may replace the dedicated proximity sensor.

Figure 2B:
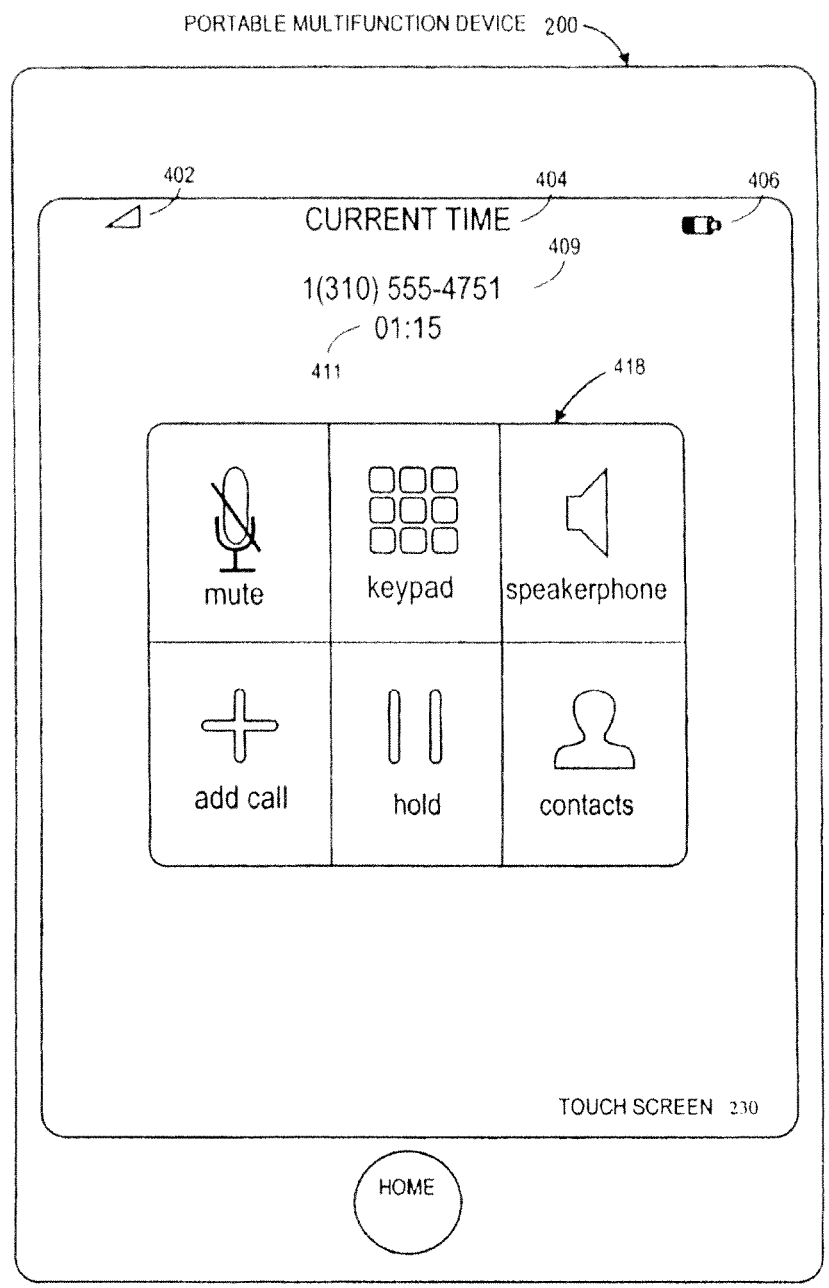
FIG. 2B depicts a portable handheld device having a touch screen display.

As suggested above, determination 150 of the device being situated in an at-ear position and an open position may control the powering of the display screen as off or on during the call, e.g. in handset mode. For instance, the display screen could be powered on in the open position and powered off when in the at-ear position. FIG. 2B depicts an example embodiment of a portable handheld device 200 showing a touch screen display being turned on during a call, while in the open position. The user interface processes running in the device 200 at this point and in this example produce the following image objects that are displayed on the front screen of the touch screen 230 during a call: current time 404; battery status indicator 406; wireless communications signal strength 402; telephone number or other identifier associated with the remote device that is participating in this call (image object 409); elapsed time for the call (image object 411); and a tray 418 containing virtual buttons for frequently used commands or functions during a call, including a mute button, a speaker phone button (to switch to speaker phone mode), a hold call button, an add call button, a contacts list button, and a keypad button. If the screen is turned off, then the device suppresses any touch input by a user, such as by accidentally touching the device with his face during a telephone call. If the screen is turned on, then a user may select virtual buttons by touching them on the screen. Thus, proximity information can be used by the device to command the screen to be turned off when in an at-ear position and to command the screen to be turned on when in an open position.

It is noted that the above-described techniques for determination of the at-ear position or open position of the device 200 may be applied to a variety of uses, including automatic switching between speaker mode and handset mode for calls and automatic control of the powering of the display screen and its content, or controlling volume of the audio signal emitted from the speaker(s). It is also noted that the second microphone 140 may be used to receive signals for other purposes as well, such as tuning the audio signal of a speaker through a feedback analysis.

Figure 4:
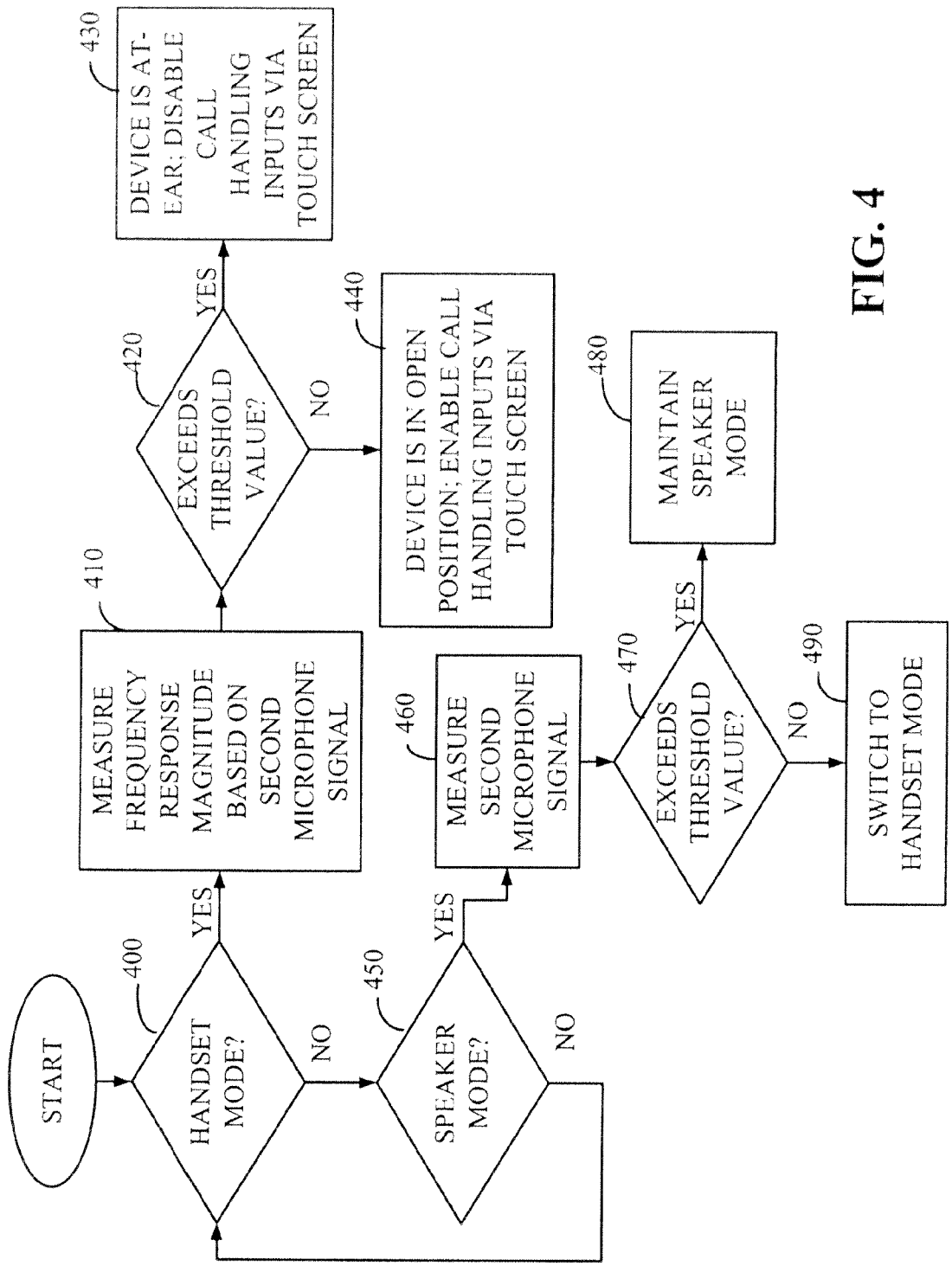
FIG. 4 is a flow diagram of a portable handheld device with enhanced proximity detection capabilities.

Proceeding to the next figure, FIG. 4 is a flow diagram of a set of example operations in a portable handheld device that may have some of the enhanced proximity detection capabilities described above. The device uses a different proximity detection analysis method depending on whether the device is operating in handset mode or speaker mode.

First, the handset mode analysis method will be described. If the device is operating in handset mode (operation 400), then the magnitude of frequency response of the receiver speaker is measured, using a second microphone located near the receiver speaker (operation 410). This measurement may be taken at a generally low frequency, such as around 300 Hz or somewhere below 1 KHz, because the effects on the acoustic environment are most prevalent in this band. If the frequency response measurement exceeds a frequency response threshold value (operation 420), then the device determines that its position is at a user's ear and may, for example, disable input via a touch screen of the device (operation 430). If the frequency response measurement falls below the frequency response threshold value (operation 420), then the device determines that its position is in an open environment (e.g., away from the user's ear) and may then enable input via the touch screen, e.g., and turning the screen on so that it is viewable to a user (operation 440). An example enabling of the touch screen display for receiving user input during a call is depicted in FIG. 2B (described above).

Next, the speaker mode analysis method will be described. If the device is not operating in handset mode (operation 400) and operating in speaker mode (operation 450), then proximity may be determined based on a time domain, power/sound pressure level reading (operation 460). If this proximity measurement exceeds a proximity threshold value (operation 470), then the device determines that it is positioned far enough away from an object such as the user's head and thus maintains speaker mode (operation 480). If the proximity measurement falls below the proximity threshold value (operation 470), then the device determines that it is positioned near an object such as the user's head and therefore switches from speaker mode to handset mode (operation 490). It is noted that the threshold value may vary, depending on the type of measurement, the configuration of the device, etc. Other uses of proximity may apply, such as turning off a touch screen display (and disabling touch screen input) once it is determined that the device has moved from an open position to an at-ear position.

Figure 5:
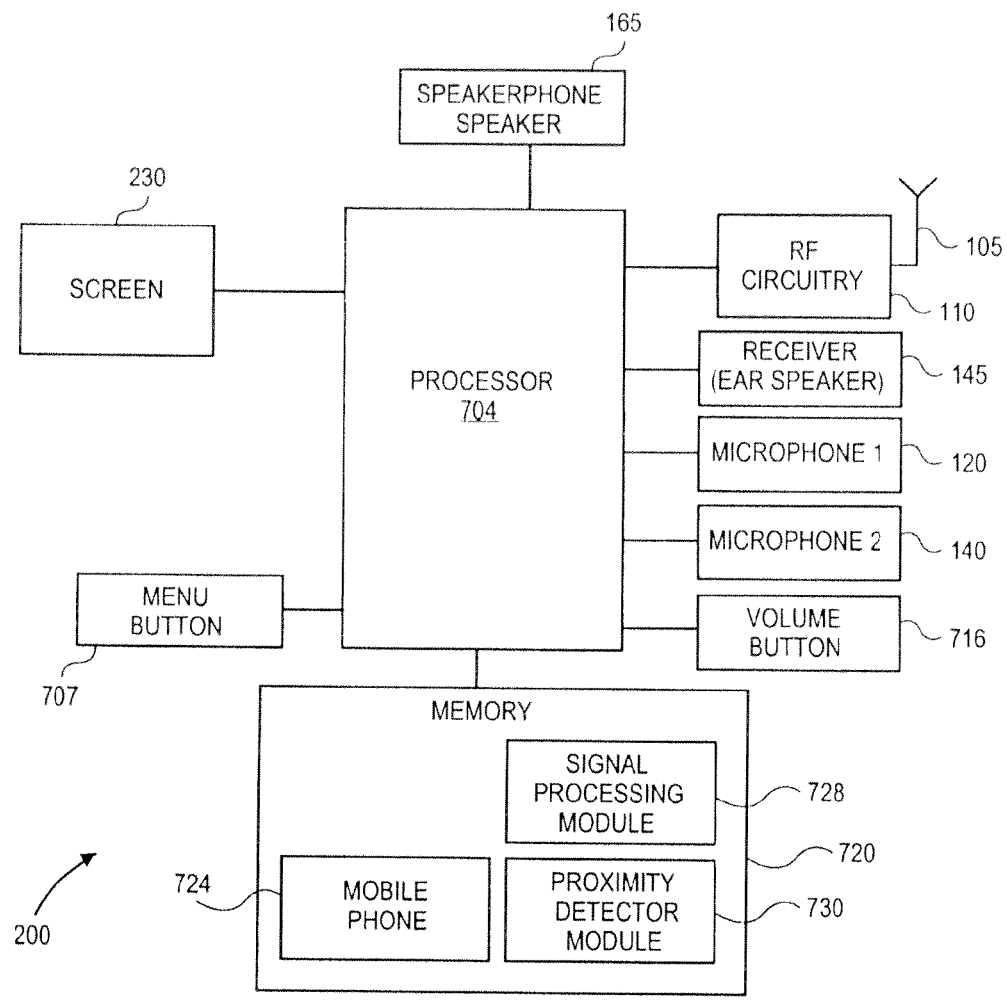
FIG. 5 depicts a block diagram of an example, portable handheld multifunction device in which an embodiment of the invention may be implemented.

FIG. 5 depicts a block diagram of an example, portable handheld multifunction device 200 in which an embodiment of the invention may be implemented. The device 200 has a processor 107 that executes instructions to carry out operations associated with the device 200. The instructions may be retrieved from memory 720 and, when executed, control the reception and manipulation of input and output data between various components of device 200. Although not shown, the memory 720 may store an operating system program that is executed by the processor 704, and one or more application programs are said to run on top of the operating system to perform different functions described below. The screen 230 displays a graphical user interface (GUI) that allows a user of the device 200 to interact with various application programs running in the device 200. The GUI displays icons or graphical images that represent application programs, files, and their associated commands on the screen 230. These may include windows, fields, dialog boxes, menus, buttons, cursors, scrollbars, etc. The user can select from these graphical images or objects to initiate the functions associated therewith.

In one embodiment, the screen 230 is a touch screen that also acts as an input device, to transfer data from the outside world into the device 200. This input is received via, for example, the user's finger touching the surface of the screen 230, but it may also be received via physical buttons on the device 200. When the screen is powered on, touch inputs may be received and when the screen is powered off, touch inputs may not be received.

Still referring to FIG. 5, the device 200 may operate in a mobile telephone mode. This is enabled by the following components of the device 200. An integrated antenna 105 that is driven and sensed by RF circuitry 110 is used to transmit and receive cellular network communication signals from a nearby base station, or wireless local area network signals from a wireless access point or router (e.g., to enable wireless VOIP calls) (not shown). A mobile phone application 724 executed by the processor 704 presents mobile telephony options on the screen 230 for the user, such as a virtual telephone keypad with call and end buttons. The mobile phone application 724 also controls at a high level the two-way conversation in a typical mobile telephone call, by directing a speech signal from the first built-in microphone 120 to an uplink voice signal processor which then feeds the RF circuitry, while at the same time directs a speech signal from the other side of the conversation to a downlink voice signal processor and then through the receiver or ear speaker 145 in handset mode, and the speakerphone speaker 165 in speaker mode. The mobile phone application 724 also responds to the user's selection of the receiver volume, by detecting actuation of the physical volume button 716. Although not shown, the processor 704 may include a cellular base band processor that is responsible for much of the uplink and downlink digital audio signal processing functions and cellular network protocol signaling associated with a cellular phone call, including encoding and decoding the voice signals of the participants to the conversation.

The device 200 may be placed in either handset mode or speaker mode for telephone calls, in response to, for example, the user actuating a physical menu button 707 and then selecting an appropriate icon on the display device of the screen 230. In telephone mode, the mobile phone application 724 controls loudness of the receiver 145 or speaker phone speaker 165, based on a detected actuation or position of the physical volume button 716. The mobile phone application 724 may also turn on and turn off the touch screen 230 during handset mode, depending on proximity of the device to the user's ear, and may also switch between handset and speakerphone modes.

Several of the elements described in FIG. 1 may be implemented as instructions stored in the memory 720 that program the processor 704. The audio signal processor may be implemented as the processor 704 programmed in accordance with a signal processing module 728 which analyzes proximity based on a frequency response measurement of the second microphone 140 and based on a time domain power or sound pressure level measurement and analysis. This analysis may be used by a proximity detector module 730, to provide a secondary cue for a final proximity determination which is passed to the mobile telephone application 724.

An embodiment of the invention may be a machine-readable medium having stored thereon instructions which program a processor to perform some of the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROM), Read-Only Memory (ROM), Random Access Memory (RAM), and Erasable Programmable Read-Only Memory (EPROM).

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed:

1. A mobile device comprising:
a handset receiver to output a receiver acoustic signal;
a first microphone that is to provide an uplink signal for a call;
a second microphone disposed closer to the handset receiver than the first microphone; and
a signal processor configured to, during the call, monitor a frequency response of the handset receiver of the mobile device over a frequency band, wherein the frequency response is based on the receiver acoustic signal from the handset receiver as detected by the second microphone and audio input to the handset receiver,
wherein the signal processor is further configured to determine a proximity of an object to the mobile device based on the frequency response,
to maintain the mobile device in one operating mode, while the frequency response over the frequency band is on one side of a predetermined threshold value, and
to switch the mobile device from said one operating mode to a different operating mode automatically, when the frequency response over the frequency band goes to another side of the predetermined threshold value.

2. The mobile device of claim 1, wherein the frequency band is in a range of less than 1000 Hz.

3. The mobile device of claim 1, wherein the one operating mode is a handset mode and the different operating mode is a speaker mode, wherein the signal processor is configured to monitor the frequency response in the handset mode, and measure a time domain sound pressure level in the speaker mode to perform proximity detection.

4. The mobile device of claim 1, wherein the signal processor is further configured to, in said one operating mode, activate a touch screen of the device to enable user input, and in the different operating mode, inactivate the touch screen to disable user input.

5. A machine-implemented method comprising:
providing an uplink signal for a call using a first microphone of a mobile device;
measuring acoustic output of a speakerphone speaker in the mobile device during the call using a second microphone that is disposed in the mobile device closer to a handset receiver of the mobile device than the first microphone;

determining a proximity of an object to the mobile device based on the measured acoustic output;

maintaining speakerphone mode of the mobile device during the call when the proximity indicates a first distance; and switching the mobile device from the speakerphone mode to handset mode automatically when the proximity indicates a second distance different from the first distance.

6. The method of claim 5, wherein user input through a touch sensitive display screen of the device is suppressed in the handset mode and enabled in the speaker phone mode.

7. The method of claim 5, wherein the proximity indicates the second distance when the mobile device is situated in an at-ear position and the first distance when the mobile device is situated in an open position.

8. The method of claim 5, further comprising:
reading a proximity sensor, wherein said determining the proximity is further based on said reading.

9. The method of claim 5, wherein said switching the mobile device comprises turning off a touch sensitive display screen of the device in the handset mode, and turning on the touch sensitive display screen of the device in the speakerphone mode.

10. The method of claim 5, wherein, in addition to the measured acoustic output, the determining the proximity is further based on a separate proximity sensor to enhance accuracy of proximity determination.

11. An apparatus comprising:
a mobile communications device housing having integrated therein:
a first microphone that is to provide an uplink signal for a call;
a handset receiver to output a receiver acoustic signal;
a second microphone disposed closer to the handset receiver than the first microphone; and
a signal processor configured to, during the call, monitor a frequency response of the handset receiver over a frequency band, wherein the frequency response is based on the receiver acoustic signal from the handset receiver as detected by the second microphone and audio input to the handset receiver,
wherein the signal processor is further configured to determine a proximity of an object to the apparatus based on the frequency response, to maintain the apparatus in one operating mode, while the frequency response over the frequency band is on one side of a predetermined threshold value, and to switch the mobile device from said one operating mode to a different operating mode automatically, when the frequency response over the frequency band goes to another side of the predetermined threshold value.

12. The apparatus of claim 11, wherein the frequency band is in a range of less than 1000 Hz.

13. The apparatus of claim 11, wherein the one operating mode is a handset mode and the different operating mode is a speaker mode, wherein the signal processor is configured to monitor the frequency response in the handset mode, and measure a time domain sound pressure level in the speaker mode to perform proximity detection.

14. The apparatus of claim 11, wherein the signal processor is further configured to, in said one operating mode, activate a touch screen of the device to enable user input, and in the different operating mode, inactivate the touch screen to disable user input.

* * * * *